Oct. 4, 1932.  J. LUNDGREN  1,881,204
DEVICE FOR CALCULATING RADIAL FORCES
Filed Dec. 5, 1927    2 Sheets-Sheet 1
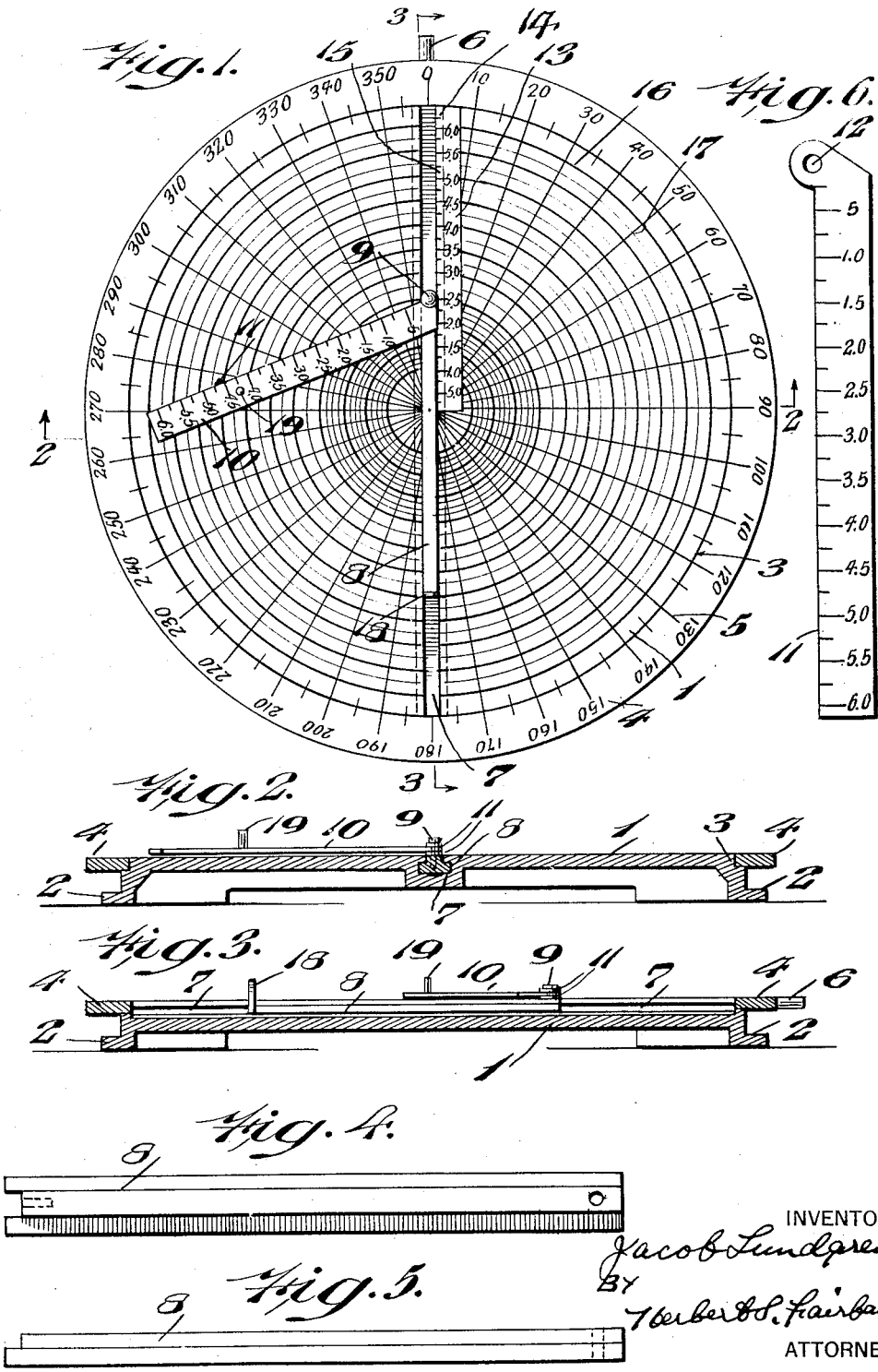
INVENTOR:
Jacob Lundgren
BY
Herbert S. Fairbanks
ATTORNEY.

Oct. 4, 1932.  J. LUNDGREN  1,881,204

DEVICE FOR CALCULATING RADIAL FORCES

Filed Dec. 5, 1927  2 Sheets-Sheet 2

INVENTOR:
Jacob Lundgren
by
Herbert S. Fairbanks
ATTORNEY.

Patented Oct. 4, 1932

1,881,204

UNITED STATES PATENT OFFICE

JACOB LUNDGREN, OF PHILADELPHIA, PENNSYLVANIA, ASSIGNOR TO TINIUS OLSEN TESTING MACHINE COMPANY, OF PHILADELPHIA, PENNSYLVANIA, A CORPORATION OF PENNSYLVANIA

DEVICE FOR CALCULATING RADIAL FORCES

Application filed December 5, 1927. Serial No. 237,826.

In determining the unbalance in a rotative specimen, it is necessary to determine the angle of unbalance and its linear location.

In many cases, the specimens are of such a character that the correction cannot be made without injury to the specimen at the point of support and it is therefore necessary to transfer the reading to a place or places at which the correction is to be made along the axis of the specimen under test. This necessitates mathematical computation which the average workman is not able to do, and, even with an expert in the balancing art, a considerable amount of time is necessary to make the proper calculations to determine the angle and the amount which is necessary for correction of the unbalance at the transfer points of the specimen at which the correction must be made.

This invention refers in particular to a system of balancing known as the selected plane system where corrections for unbalance are made in two selected planes along the axis of the specimen.

The object of this invention is to devise a novel system of and apparatus for determining the proper angle of correction and the amount of unbalance at a point or points different from the points of support and along the axis of the specimen, and in some cases an angle different from that which was originally determined.

A further object of this invention is to devise novel transfer and computing instruments which can be used by unskilled persons or by persons with ordinary skill in the art, so that the proper results can be obtained in a minimum amount of time.

A further object of the invention is to devise a novel transfer instrument which determines the amount of unbalance at determined points of correction.

A further object of the invention is to devise a novel angle computing instrument.

A further object of this invention is to devise novel transfer and computing instruments which can be conveniently attached to and form a part of a balancing machine, so that the operator of the machine, during the balancing operation, can not only determine the angle and linear location of the unbalance shown by the readings of the machine, but he can also determine and transfer the correct amount and angle of unbalance at any desired point along the axis of the specimen without removing the specimen from the balancing machine and without turning the specimen around in the balancing machine or transferring it to a second machine.

With the above and other objects in view as will hereinafter clearly appear, my invention comprehends a novel system and apparatus for the transfer of the pressure caused by an unbalance at the point of support of a rotative specimen to any other point along the axis of the specimen under test, and instruments to determine the resultant angle and amount of unbalance from two other different planes with equal or different amounts.

It further comprehends a novel construction and arrangement of a transfer instrument.

It further comprehends a novel construction and arrangement of an angle computing instrument.

Other novel features of construction and advantage will hereinafter more clearly appear in the detailed description and the appended claims.

For the purpose of illustrating the invention, I have shown in the accompanying drawings, typical embodiments of it, which, in practice, will give satisfactory and reliable results. It is, however, to be understood that the various instrumentalities of which my invention consists can be variously arranged and organized, and my invention is not limited to the exact arrangement and organization of these instrumentalities, as herein set forth.

Figure 1 is a plan view of an angle computing instrument for balancing machines, embodying my invention and forming a part of my novel system.

Figure 2 is a section on line 2—2 of Figure 1.

Figure 3 is a section on line 3—3 of Figure 1.

Figure 4 is a side view of an indicator slide.

Figure 5 is a side elevation of the indicator slide seen in Figure 4.

Figure 6 is a side view of the indicator scale.

Similar numerals of reference indicate corresponding parts.

Referring to the drawings:—

Figure 7:
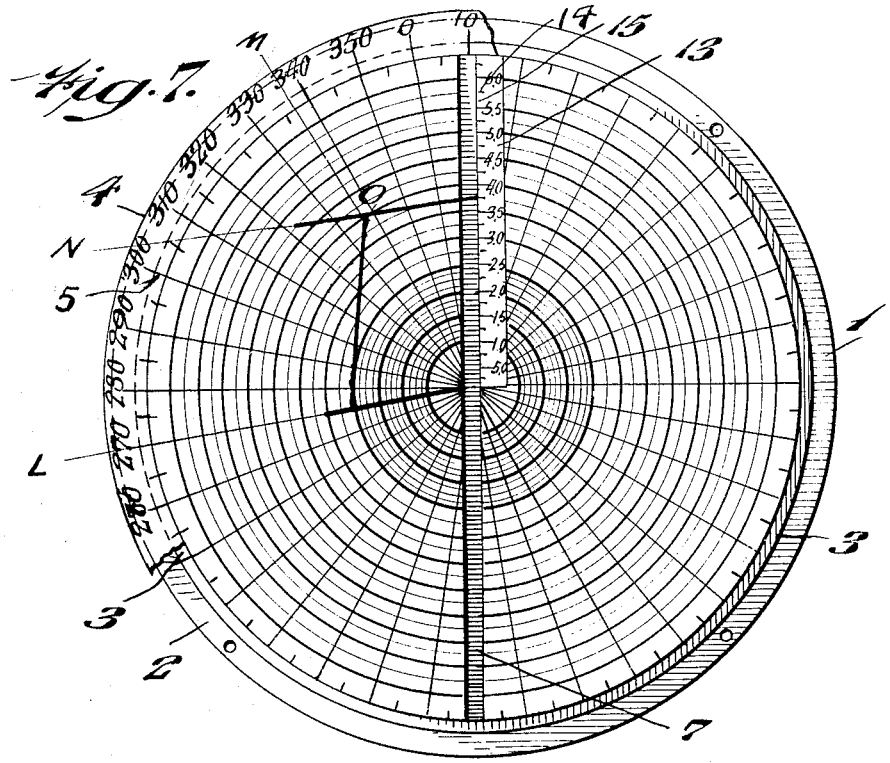
Figure 7 is a top plan view of the body portion of the angle computing instrument, with a portion of the angle ring and other mechanism removed.
Figure 8:
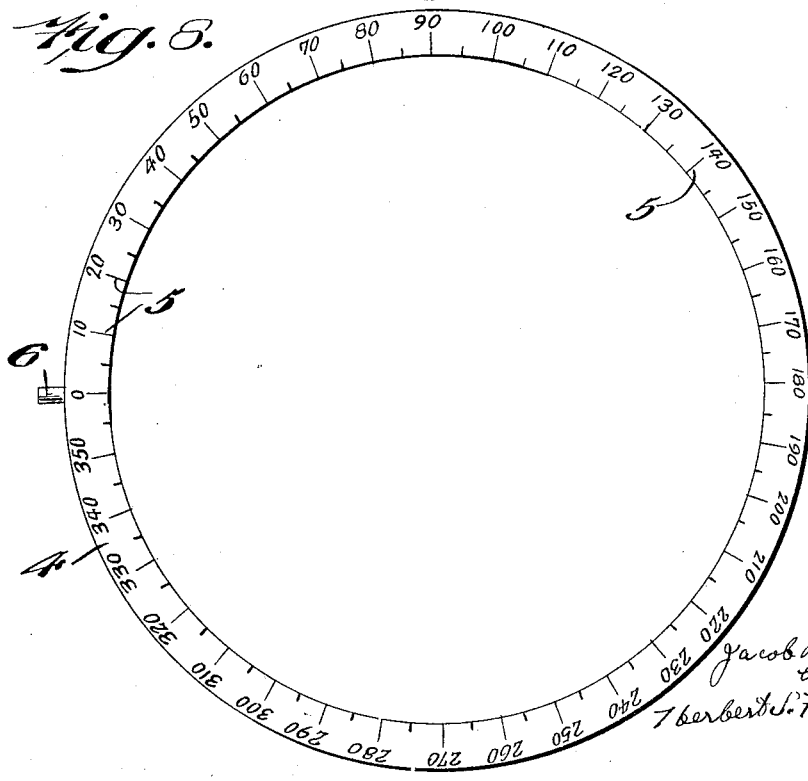
Figure 8 is a plan view of the angle dial in detached position.

Referring to the angle computing instrument shown in Figures 1 to 8 inclusive, the instrument is provided with a body portion 1 having a peripheral base flange 2 adapted to be connected in any desired manner to a balancing machine or other support, so that its top face will be either horizontal, perpendicular, or at any desired angle.

The body portion 1 at its outer periphery is provided with an annular recess 3 to adapt it to receive an angle dial 4 which is graduated in terms of degrees as indicated at 5. This angle dial 4, if desired, may have connected with it in any desired manner, a grasping handle 6 to effect its rotatable adjustment on the body portion 1.

The top face of the body portion 1 is provided with a diametrically disposed T shaped slot 7, in which is adjustable, a slide or shoe 8 having a T shape formation at its bottom to slidably engage the walls of the recess 7, and having a handle 18. 9 designates a pivot pin which secures an indicator 10 to the slide 8 and between the pivot pin and the indicator, and between the indicator and the slide, friction washers 11 are interposed. The indicator 10 is in the form of a graduated scale, having a straight edge 11 in line with the pivot point 12 through which the pivot pin 9 passes, and is provided with a handle 19.

The top face of the body portion 1 has fixed to it a stationary scale 13 having the graduations 14 and the straight edge 15, the graduations indicating the distance of the circles 16 from the center of the circle. The radial lines 17 are spaced ten degrees apart.

It will be understood from the foregoing that the angle indicator 10 can be adjusted for any angle determined during the balancing operation and it can be moved bodily with its slide a desired number of ounce inches as determined by the balancing operation of the specimen and as indicated by the scale 13. A resultant of the two angles can thus be obtained and a resultant amount so that the correction for unbalance can be made in a single plane.

The amounts are reduced to one resultant value in one plane by use of the angle computing instrument shown in Figures 1 to 8 inclusive.

We will assume that the amount to be corrected to one resultant value in one plane are three and one-half ounce inches at 10°, and two ounce inches at 270°. The angle dial 4 is rotatably adjusted to bring its 10° graduation in line with the straight edge 15 of the scale 13. The indicator scale 10 is then pushed up with its slide from line L indicating an angle of 270°, see Figure 7, three and one-half ounce inches to line N, see Figure 7, without changing the angle of the slide. The two ounce inch mark on the angle slide 10 indicates the location and angle of the computed value as at point 0 and it will be clear that this point is approximately three and three-quarter inches at an angle of about 338° as shown by line N. This therefore indicates that the resultant correction on the specimen is three and three-quarter ounce inches at an angle of approximately 338°.

My present invention for determining and indicating the transfer of pressure caused by unbalance at points of support of the specimen is adapted to be employed in conjunction with all types of balancing machines wherein two selected planes of correction are employed.

My invention also involves in the carrying out of the steps of the cycle as herein set forth, a novel method of determining, indicating and transferring the pressure caused by unbalance at two points of support to desired planes of correction, and also a novel method of reducing the values determined for two different planes of correction into one resultant value in one plane of the specimen which is to be balanced.

It will be apparent to those skilled in this art that in carrying out my novel method herein disclosed, the pressure caused by unbalance at points of support of a rotative specimen are determined in the balancing machine and the values thus obtained are mechanically transferred and visibly indicated to the proper values at two determined planes of correction.

Instead of correcting in two different planes, I also as a part of the method herein disclosed, mechanically reduce the values obtained for the two planes of correction to a resultant value in one plane of the specimen.

It will now be apparent that I have devised a new and useful system and apparatus which embodies the features of advantage enumerated as desirable in the statement of the invention and the above description, and, while I have, in the present instance, shown and described a preferred embodiment thereof which will give in practice satisfactory and reliable results, it is to be understood, however, that this embodiment is susceptible of modification in various particulars without departing from the spirit or scope of the invention or sacrificing any of its advantages.

Having thus described my invention what I claim as new and desire to secure by Letters Patent, is:—

1. An angle computing instrument for computing the angle of unbalance in a rotative body, comprising a body portion having indicated thereon radial lines indicative of degrees and circular lines indicative of ounce inches, an indicator in the form of a graduated scale adapted to move in a diametrical path across the body portion, a stationary scale along said path, and an angle dial rotatably adjustable on said body portion.

2. An angle computing instrument for determining the resultant of different calculations of unbalance in a rotative specimen, comprising a body portion having indicated thereon lines indicative of degrees and lines indicative of ounce inches, an indicator in the form of a graduated scale pivotally supported and radially adjustable on said body portion, a stationary scale along the path of the pivotal support of said indicator, and an angle dial rotatably carried by said body portion.

3. An angle computing instrument for determining the resultant of different calculations of unbalance of a rotative specimen, comprising a body portion having indicated thereon lines indicative of degrees and lines indicative of ounce inches, an indicator carrier diametrically adjustable on said body portion, an indicator in the form of a graduated scale, pivotally carried by said carrier, a stationary scale positioned along the path of movement of said carrier, and an angle dial having graduations and rotatably adjustable on said body portion.

JACOB LUNDGREN.